US008929928B2

(12) United States Patent
Lee et al.

(10) Patent No.: US 8,929,928 B2
(45) Date of Patent: Jan. 6, 2015

(54) ESTABLISHMENT OF MULTIMEDIA SERVICE SESSIONS IN MOBILE TERMINALS

(75) Inventors: Hyung-Jin Lee, Seoul (KR); Yong-Ki Min, Seoul (KR)

(73) Assignee: KT Corporation, Gyeonggi-do (KR)

( * ) Notice: Subject to any disclaimer, the term of this patent is extended or adjusted under 35 U.S.C. 154(b) by 615 days.

(21) Appl. No.: 12/508,446

(22) Filed: Jul. 23, 2009

(65) Prior Publication Data

US 2009/0286561 A1 Nov. 19, 2009

Related U.S. Application Data

(63) Continuation of application No. PCT/KR2008/000307, filed on Jan. 18, 2008.

(30) Foreign Application Priority Data

Jan. 23, 2007 (KR) .................. 10-2007-0007061

(51) Int. Cl.
*H04W 4/00* (2009.01)
*H04W 4/14* (2009.01)
*H04W 76/02* (2009.01)

(52) U.S. Cl.
CPC .............. *H04W 4/14* (2013.01); *H04W 76/02* (2013.01)
USPC ......... 455/466; 455/435.1; 455/406; 455/436

(58) Field of Classification Search
CPC ..... H04W 88/06; H04W 76/02; H04W 48/18; H04M 2215/204; H04L 65/1016; H04L 67/14; H04L 29/12094; H04L 61/1529
USPC ................... 455/466; 370/328–349
See application file for complete search history.

(56) References Cited

U.S. PATENT DOCUMENTS

| 6,895,251 B2 * | 5/2005 | Soh et al. ............ 455/466 |
| 2003/0013467 A1 * | 1/2003 | Caloud ............... 455/466 |

(Continued)

FOREIGN PATENT DOCUMENTS

| EP | 1 555 838 A2 | 7/2005 |
| KR | 2003-0095000 | 12/2003 |

(Continued)

OTHER PUBLICATIONS

International Search Report for International Application No. PCT/KR2008/000307 dated Mar. 25, 2008 by Korean Intellectual Property Office.

(Continued)

*Primary Examiner* — Gerald Johnson
(74) *Attorney, Agent, or Firm* — IP Legal Services, LLC

(57) ABSTRACT

A multimedia service providing method in a telecommunication network is disclosed. In one embodiment, the method includes (a) communicating, at a message providing server, data with first and second mobile terminals in an Internet protocol (IP) based mobile communication network, (b) receiving, at a message providing server, a short message from the first mobile terminal, wherein the short message indicates that the first mobile terminal requests a multimedia service from the second mobile terminal, and wherein the short message comprises a predetermined header field to determine whether the message requests the multimedia service and (c) transmitting the short message to the second mobile terminal, wherein the transmitted short message is configured to control the second mobile terminal to set a packet data protocol (PDP) session, for performing the multimedia service, with the first mobile terminal.

8 Claims, 4 Drawing Sheets

(56) References Cited

U.S. PATENT DOCUMENTS

| | | | |
|---|---|---|---|
| 2003/0123423 A1 | 7/2003 | Okanoue | |
| 2005/0135348 A1 | 6/2005 | Staack | |
| 2005/0176423 A1 | 8/2005 | Park et al. | |
| 2005/0202819 A1* | 9/2005 | Blicker | 455/435.1 |
| 2005/0238002 A1 | 10/2005 | Rasanen | |
| 2007/0218871 A1* | 9/2007 | Bonner | 455/406 |
| 2007/0293251 A1* | 12/2007 | Bienas et al. | 455/466 |
| 2008/0146256 A1* | 6/2008 | Hawkins et al. | 455/466 |
| 2008/0280612 A1* | 11/2008 | Bornier et al. | 455/436 |

FOREIGN PATENT DOCUMENTS

| | | |
|---|---|---|
| KR | 10-2004-0032399 | 4/2004 |
| KR | 10-2005-0080298 | 8/2005 |
| WO | 2005/027460 A1 | 3/2005 |

OTHER PUBLICATIONS

An Office Action for Korean Patent Application No. 10-2007-0007061 dated Feb. 28, 2008 by Korean Patent Intellectual Property Office.

"Push OTA Protocol", Wireless Application Protocol WAP-235-PushOTA-20010425-a, Version 25—Apr. 2001, pp. 1-44, Wireless Application Protocol Forum, Ltd.

3GPP TR 23.976 v6.1.0 (Jun. 2004), "3rd Generation Partnership Project; Technical Specification Group Services and System Aspects Push architecture (Release 6)", Jun. 2004, pp. 1-34, vol. 3-SA2, No. V6.1,0, 3GPP Organizational Partners, France.

European Patent Office(EPO), Office Action dated Sep. 28, 2012, for EP Patent Application No. 08704843.5 (2127405).

* cited by examiner

FIG. 4

| First Octet | TP-MR | TP-DA | TP-PID | TP-DCS | TP-VP | TP-VDL | TP-VD |
|---|---|---|---|---|---|---|---|
| | | | 1byte | | Optional | | optional |

410

ESTABLISHMENT OF MULTIMEDIA SERVICE SESSIONS IN MOBILE TERMINALS

RELATED APPLICATIONS

This application is a continuation application, and claims the benefit under 35 U.S.C. §§120 and 365 of PCT Application No. PCT/KR2008/000307, filed on Jan. 18, 2008, which is hereby incorporated by reference. PCT/KR2008/000307 also claimed priority from Korean Patent Application No. 10-2007-0007061, filed on Jan. 23, 2007, which is hereby incorporated by reference.

BACKGROUND OF THE INVENTION

1. Field of the Invention

The present invention relates to a multimedia service method in a mobile communication network, more specifically to a method of providing a multimedia service based on a short message.

2. Description of the Related Technology

The generation partnership project (3GPP) has made the standard forming an Internet protocol (IP) based mobile communication network and providing a multimedia service based on a general packet radio service (GPRS) network provided from the universal mobile telephony service/general packet radio service (UMTS/GPRS), which is the third generation mobile communication service. In the IP based mobile communication network suggested by the 3GPP, since data transmission between all nodes constituting the network is performed by an IP based transmission method, it is easy to link the network with an Internet network.

SUMMARY OF CERTAIN INVENTIVE ASPECTS

One aspect of the present invention is a multimedia service of an IP based mobile communication network that can efficiently use IP resources which may be lost unnecessarily.

Another aspect of the present invention is a multimedia service of an IP based mobile communication network that can cut down an installation expense by removing unnecessary wire or wireless resources to reduce the number of communication equipment.

Another aspect of the present invention is a multimedia service providing method of a message providing server of an Internet protocol (IP) based mobile communication network.

Another aspect of the present invention is a multimedia service providing method of a message providing server of an Internet protocol (IP) based mobile communication network, which can include (a) receiving a short message for requesting a multimedia service from a first mobile terminal; and (b) transmitting the short message for requesting the multimedia service to a second mobile terminal corresponding to the short message for requesting the multimedia service. Here, the short message for requesting the multimedia service has a predetermined field of header fields to determine whether the message requests the multimedia service, and if the short message for requesting the multimedia service is received, the second mobile message sets a PDP session for executing the multimedia service with the first mobile terminal.

Another aspect of the present invention is a multimedia service executing method which is performed in a first mobile terminal that requests a multimedia service and a second mobile terminal that attempts to execute the multimedia service by using a message providing server of an Internet protocol (IP) based mobile communication network.

Another aspect of the present invention is a multimedia service executing method which is performed in a first mobile terminal that requests a multimedia service and a second mobile terminal that attempts to execute the multimedia service by using a message providing server of an Internet protocol (IP) based mobile communication network, which can include (a) receiving a short message for requesting a multimedia service from a first mobile terminal; and (b) setting a PDP session for executing the multimedia service with the first mobile terminal. Here, the short message for requesting the multimedia service has a predetermined field of header fields to determine whether the message requests the multimedia service.

Another aspect of the present invention is a recorded medium tangibly embodying a program of instructions executable by a message providing server of an Internet protocol (IP) based mobile communication network to execute a multimedia service providing method, the recording medium being readable by electronic apparatuses recorded with the program.

Another aspect of the present invention is a recorded medium tangibly embodying a program of instructions executable by a message providing server of an Internet protocol (IP) based mobile communication network to execute a multimedia service providing method, the recording medium being readable by electronic apparatuses recorded with the program, which can include (a) receiving a short message for requesting a multimedia service from a first mobile terminal; and (b) transmitting the short message for requesting the multimedia service to a second mobile terminal corresponding to the short message for requesting the multimedia service. Here, the short message for requesting the multimedia service has a predetermined field of header fields to determine whether the message requests the multimedia service, and if the short message for requesting the multimedia service is received, the second mobile message sets a PDP session for executing the multimedia service with the first mobile terminal.

Another aspect of the present invention is a recorded medium tangibly embodying a program of instructions executable by a first mobile terminal, which requests a multimedia service, and a second mobile terminal, which attempts to execute the multimedia service by using a message providing server of an Internet protocol (IP) based mobile communication network, to execute a multimedia service providing method, the recording medium being readable by electronic apparatuses recorded with the program.

Another aspect of the present invention is a recorded medium tangibly embodying a program of instructions executable by a first mobile terminal, which requests a multimedia service, and a second mobile terminal, which attempts to execute the multimedia service by using a message providing server of an Internet protocol (IP) based mobile communication network, to execute a multimedia service providing method, the recording medium being readable by electronic apparatuses recorded with the program, which can include (a) receiving a short message for requesting a multimedia service from a first mobile terminal; and (b) setting a PDP session for executing the multimedia service with the first mobile terminal. Here, the short message for requesting the multimedia service has a predetermined field of header fields to determine whether the message requests the multimedia service.

Another aspect of the invention is a multimedia service providing method in a telecommunication network, the method comprising: (a) communicating, at a message providing server, data with first and second mobile terminals in an Internet protocol (IP) based mobile communication network; (b) receiving, at a message providing server, a short message from the first mobile terminal, wherein the short message indicates that the first mobile terminal requests a multimedia service from the second mobile terminal, and wherein the short message comprises a predetermined header field to determine whether the message requests the multimedia service; and (c) transmitting the short message to the second mobile terminal, wherein the transmitted short message is configured to control the second mobile terminal to set a packet data protocol (PDP) session, for performing the multimedia service, with the first mobile terminal.

In the above method, the predetermined header field is a protocol identifier (PID) field or a tele-service identifier (TID) field included in a transport protocol data unit (TPDU) of the short message for requesting the multimedia service. In the above method, (b) and (c) are performed in a state where a circuit call for voice call between the first mobile terminal and the second mobile terminal is connected. The above method further comprises controlling the second mobile terminal to perform a session initiation protocol (SIP) registration, for performing the multimedia service, with the first mobile terminal. In the above method, the message providing server is a short message service center.

Another aspect of the invention is a multimedia service providing method in a telecommunication network, the method comprising: (a) communicating data with a first mobile terminal and a message providing server in an Internet protocol (IP) based mobile communication network; (b) receiving, at a second mobile terminal, a short message from the first mobile terminal, wherein the short message indicates that the first mobile terminal requests a multimedia service from the second mobile terminal, and wherein the short message comprises a predetermined header field to determine whether the message requests the multimedia service; and (c) setting, at the second mobile terminal, a packet data protocol (PDP) session, for performing the multimedia service, with the first mobile terminal.

In the above method, the predetermined header field is a protocol identifier (PID) field or a tele-service identifier (TID) field included in a transport protocol data unit (TPDU) of the short message for requesting the multimedia service. In the above method, (b) and (c) are performed in a state where a circuit call for voice call between the first mobile terminal and the second mobile terminal is connected. The above method further comprises allowing the first mobile terminal to set a packet data protocol session with a packet data serving node corresponding to the first mobile terminal, prior to (b). The above method further comprises allowing the first mobile terminal to perform a session initiation protocol (SIP) registration for performing the multimedia service. In the above method, (c) comprises: (c-1) transmitting a response message in the received short message for requesting the multimedia service to the first mobile terminal; (c-2) checking whether to set a PDP session for performing the multimedia service with the first mobile terminal if the response message is related to accepting the request of the multimedia service; and (c-3) setting the PDP session for performing the multimedia service with the first mobile terminal if the PDP session is not set as the result of checking it.

In the above method, (c) comprises allowing the second mobile terminal to perform a session initiation protocol (SIP) registration for performing the multimedia service with the first mobile terminal. The above method further comprises: (d) checking whether the first mobile terminal and the second mobile terminal are possible to execute the multimedia service; and (e) allow multimedia data to be transmitted between the first mobile terminal and the second mobile terminal if it is checked that the first mobile terminal and the second mobile terminal are possible to execute the multimedia service, following (c).

Another aspect of the invention is one or more processor-readable storage devices having processor-readable code, the processor-readable code for programming one or more processors to perform a multimedia service providing method in a telecommunication network, the method comprising: (a) communicating, at a message providing server, data with first and second mobile terminals in an Internet protocol (IP) based mobile communication network; (b) receiving, at a message providing server, a short message from the first mobile terminal, wherein the short message indicates that the first mobile terminal requests a multimedia service from the second mobile terminal, and wherein the short message comprises a predetermined header field to determine whether the message requests the multimedia service; and (c) transmitting the short message to the second mobile terminal, wherein the transmitted short message is configured to control the second mobile terminal to set a packet data protocol (PDP) session, for performing the multimedia service, with the first mobile terminal.

Another aspect of the invention is one or more processor-readable storage devices having processor-readable code, the processor-readable code for programming one or more processors to perform a multimedia service providing method in a telecommunication network, the method comprising: (a) communicating data with a first mobile terminal and a message providing server in an Internet protocol (IP) based mobile communication network; (b) receiving, at a second mobile terminal, a short message from the first mobile terminal, wherein the short message indicates that the first mobile terminal requests a multimedia service from the second mobile terminal, and wherein the short message comprises a predetermined header field to determine whether the message requests the multimedia service; and (c) setting, at a second mobile terminal, a packet data protocol (PDP) session, for performing the multimedia service, with the first mobile terminal.

Another aspect of the invention is a system for providing a multimedia service in a telecommunication network, the system comprising: a communicating unit configured to communicate data with first and second mobile terminals in an Internet protocol (IP) based mobile communication network; a receiving unit configured to receive a short message from the first mobile terminal, wherein the short message indicates that the first mobile terminal requests a multimedia service from the second mobile terminal, and wherein the short message comprises a predetermined header field to determine whether the message requests the multimedia service; and a transmitting unit configured to transmit the short message to the second mobile terminal, wherein the transmitted short message is configured to control the second mobile terminal to set a packet data protocol (PDP) session, for performing the multimedia service, with the first mobile terminal.

Still another aspect of the invention is a system for providing a multimedia service in a telecommunication network, the system comprising: a communicating unit configured to communicate data with a mobile terminal and a message providing server in an Internet protocol (IP) based mobile communication network; a receiving unit configured to receive a short message from the message providing server, wherein the short message indicates that the mobile terminal requests a multimedia service, and wherein the short message comprises a predetermined header field to determine whether the message requests the multimedia service; and a setting unit configured to set a packet data protocol (PDP) session, for performing the multimedia service, with the mobile terminal.

BRIEF DESCRIPTION OF THE DRAWINGS

FIG. 4 shows a short message for requesting a multimedia service in accordance with an embodiment of the present invention.

DETAILED DESCRIPTION OF CERTAIN INVENTIVE EMBODIMENTS

Figure 1:
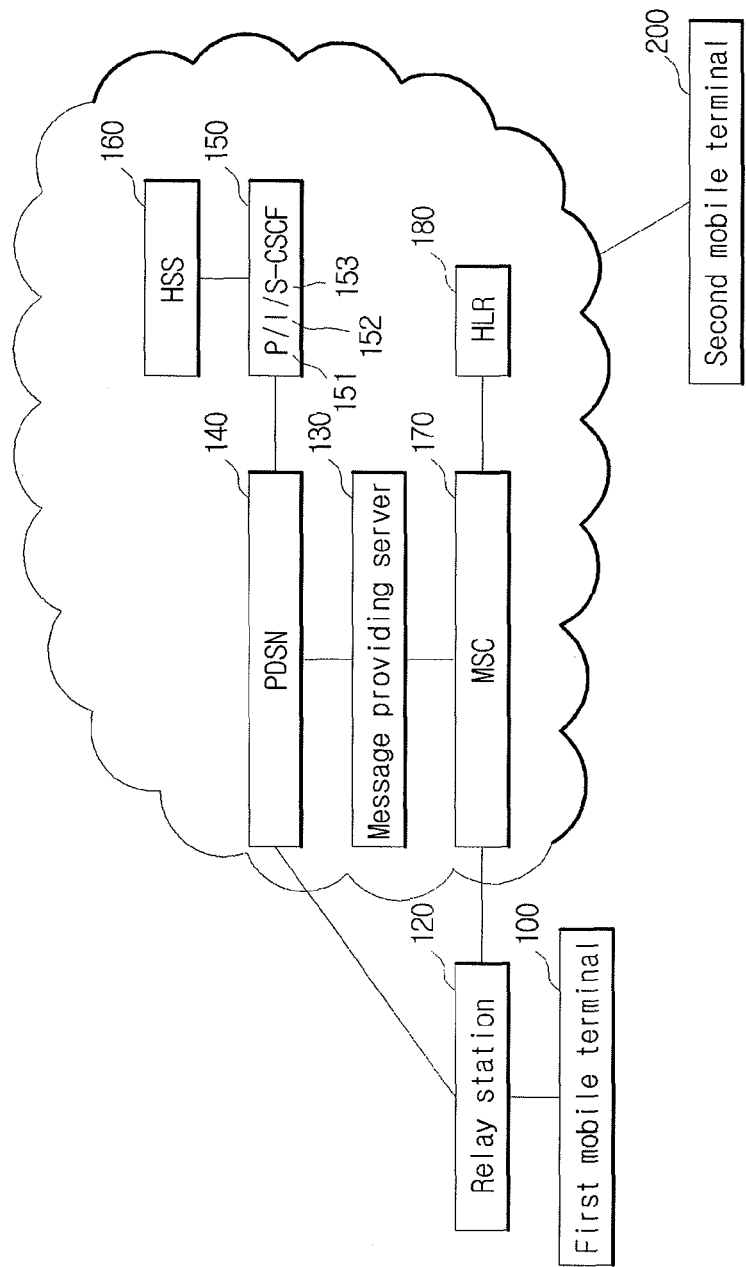
FIG. 1 shows the structure of a mobile communication network providing a multimedia service in accordance with an embodiment of the present invention.

In order to provide the multimedia services between terminals in the IP based mobile communication network, packet data protocol (PDP) activation or session initiation protocol (SIP) registration is generally performed before providing the multimedia services.

If a requesting terminal requests an opposite terminal to execute a multimedia service with the requesting terminal, the opposite terminal is required to have performed IP allotment or SIP registration in advance in order to allow the opposite terminal to execute the requested multimedia service with the requesting terminal. In other words, executing the multimedia service requires allowing the opposite terminal attempting to execute the multimedia service to occupy IP resources at the point of time when the multimedia service is requested. For this, the moment a power is supplied to the terminal or a pertinent application program is operated (in this case, the multimedia service can be requested after the opposite terminal executes the application program), the opposite terminal attempting to execute the multimedia service performs a preparing operation (e.g. PDP activation and SIP registration) for executing the multimedia service.

Accordingly, even though each terminal does not execute the multimedia service, the terminals are required to occupy wire or wireless resources in order to execute the multimedia service. This results in the loss of IP resources and the load of communication equipment.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of the present invention will be described in detail with reference to the accompanying drawings. Throughout the drawings, similar elements are given similar reference numerals and the pertinent overlapped description will be omitted. Throughout the description, detailed description of certain irrelevant elements will be omitted.

FIG. 1 shows the structure of a mobile communication network providing a multimedia service in accordance with an embodiment of the present invention;

As shown in FIG. 1, the mobile communication network providing a multimedia service in accordance with an embodiment of the present invention can include a first mobile terminal 100, a relay station 120, a message providing server 130, a mobile switching center/gateway (MSC) 170, a packet data serving node (PDSN) 140, a call session control function (CDCF) 150, a home subscriber server (HSS) 160 and a home location register (HLR) 180

The first mobile terminal 100 and a second mobile terminal 200, which are the terminals capable of performing the communication by using a mobile communication network, can be mobile phones, personal digital assistants (PDA), and laptop computers, for example.

In the state where a circuit service call is connected between the first mobile terminal 100 and the second mobile terminal 200, the first mobile terminal 100 transmits a short message for requesting a multimedia service to the second mobile terminal 200 before transmitting multimedia data to the second mobile terminal 200.

The second mobile terminal 200 receives the short message for requesting the multimedia service from the first mobile terminal 100 and analyzes a protocol identifier (PID) or a tele-service identifier (TID) field. As the result of analyzing it, if the pertinent short message is the short message for requesting the multimedia service received from the first mobile terminal 100, the second mobile terminal 200 transmits the corresponding response message to the first mobile terminal 100.

If the response message is related to accepting the request of the multimedia service, the first mobile terminal 100 and the second mobile terminal 200 check whether a packet data protocol (PDP) session is set to execute the multimedia service. If the PDP session is not set, the first mobile terminal 100 and the second mobile terminal 200 set the PDP session and register a session initiation protocol (SIP).

In the first mobile terminal 100 and the second mobile terminal 200, the PDP session is set between each terminal and the PDSN corresponding to each terminal and the SIP is registered in the CSCF corresponding to each terminal.

The first mobile terminal 100 and the second mobile terminal 200, as described above, can connect a session for packet data through the PDP session setting and the SIP registration during voice call. This can make it possible to exchange multimedia data between the first mobile terminal 100 and the second mobile terminal 200.

For example, the first mobile terminal 100 can take a photograph and transmit the photograph to the photograph to the second mobile terminal 200 while being connected to the second mobile terminal 200 for voice call.

The relay station 120 relays circuit data and packet data through the wireless access to the first mobile terminal 100. For example, the relay station 120 can be the UMTS terrestrial radio access network (UTRAN) of a WCDMA system.

The message providing server 130 provides a message service to the first mobile terminal 100 and the second mobile terminal 200. For example, the message providing server 130 can be a short message service center (SMSC). The message providing server 130 transmits a short message for requesting the multimedia service to the second mobile terminal 200 according to a transmission request of the first mobile terminal 100. Here, in the short message for requesting the multimedia service, a PID or TID field included at its header field is pre-determined in order to request the second mobile terminal 200 to execute the multimedia service. The short message for requesting the multimedia service will be described in more detail with reference to FIG. 4.

The MSC 170 provides a circuit service at the current position of the first mobile terminal 100 and links external circuit data networks with to each other.

The PDSN 140 performs session control functions of the first mobile terminal such as setting, maintenance and release of the session for transmitting packet data and links a general packet radio service (GPRS) network with the external packet data network.

The CSCF 150 performs functions related to the call and session processing of the first mobile terminal 100 such as an incoming call gateway function, a call control function, a serving profile database and an address handling function. The incoming call gateway function of the CDCF 150 indicates the operation as an entry point and the performance of routing for an input call. The CSCF 150 performs a service triggering for the input call such as call screening and forwarding and has a communication with the HSS. The call control function of the CSCF 150 includes management of call setting, stop and status/event, correlation with MRF for multilateral services, call event report for charging and receiving and processing of application level registration.

The CSCF 150 can be divided into a P-CSCF(Proxy) 151. I-CSCF(Interrogating) 152 and S-CSCF(Serving) 153 according to its functions.

The P-CSCF 151 is the area which the mobile terminal firstly encounters when the mobile terminal access an IP multimedia subsystem through a GPRS access. For the P-CSCF 151, the first mobile terminal 100 can acquire a pertinent address by using a dynamic host configuration protocol (DHCP) (not shown) or though a PDP context. The P-CSCF 151 transfers a SIP registration requesting message received from the first mobile terminal 100 to the I-CSCF 152 of home domain of the first mobile terminal 100 and stores the address of the S-CSCF 153 in the registration process. Then, if there is a SIP message proceeding from the first mobile terminal 100 toward the S-CSCF 153, the can transfer the SIP message to the S-CSCF 153. The P-CSCF 151 is the area which the mobile terminal firstly encounters when the mobile terminal access the IMS and is placed in the domain in which a GGSN is placed. The address of P-CSCF 151 is transferred to the first mobile terminal by the PDP context activation.

The P-CSCF 151 can transfer the SIP registration requesting message received from the first mobile terminal 100 to the I-CSCF 152 by referring to the home domain of the first mobile terminal 100 and manage the address of the S-CFCF 153 acquired in the SIP registration requesting processing operation. The P-CSCF 151 transfers a response of the IMS service, received from the I-CSCF 152 or the S-CSCF 153, to the first mobile terminal 100.

The I-CSCF 152 functions as a contact point for all coming calls to connect subscribers in the network and for other-network subscribers having applied the roaming service of the network. This makes it possible to allow the I-CSCF to function as a firewall and to have a concealing function to provide the structure, topology and capacity of the provider's network to be exposed to an outside.

When receiving a SIP registration requesting message, the I-CSCF 152 can select the HSS 160, receive the address of the S-CSCF 153 and allot the S-CSCF 153 dealing with actual registration.

The S-CSCF 153 manages all session statuses of IMS and performs main functions for call processing by being linked with the HSS 160 and receiving a subscriber's profile. The S-CSCF 153, which is a subsystem controlling the session of the first mobile terminal 100, registers subscribers in the HSS 160 before downloading subscriber information and storing and managing a corresponding service profile.

The HSS 160 performs mobile management of the first mobile terminal 100 through a CS domain, a PS domain and the IMS.

The HLR 180 generates security information of subscribers. The HLR 180 generates data for authenticating users, checking the integrity of message and supporting a coding function and supports each service functional factor authenticating procedure. The HLR 180 checks whether to make it possible to apply the loaming service in a visiting network of mobile subscribers and performs a network access authority verifying function.

The first mobile terminal 100 can set the PDP session among the first mobile terminal 100, the relay station 120 and the PDSN 140 through the GPRS session setting operation of the mobile communication network having the foregoing structure. Also, the first mobile terminal 100 can perform the SIP registration and receive the IP multimedia service through the CSCF 150.

Figure 2:
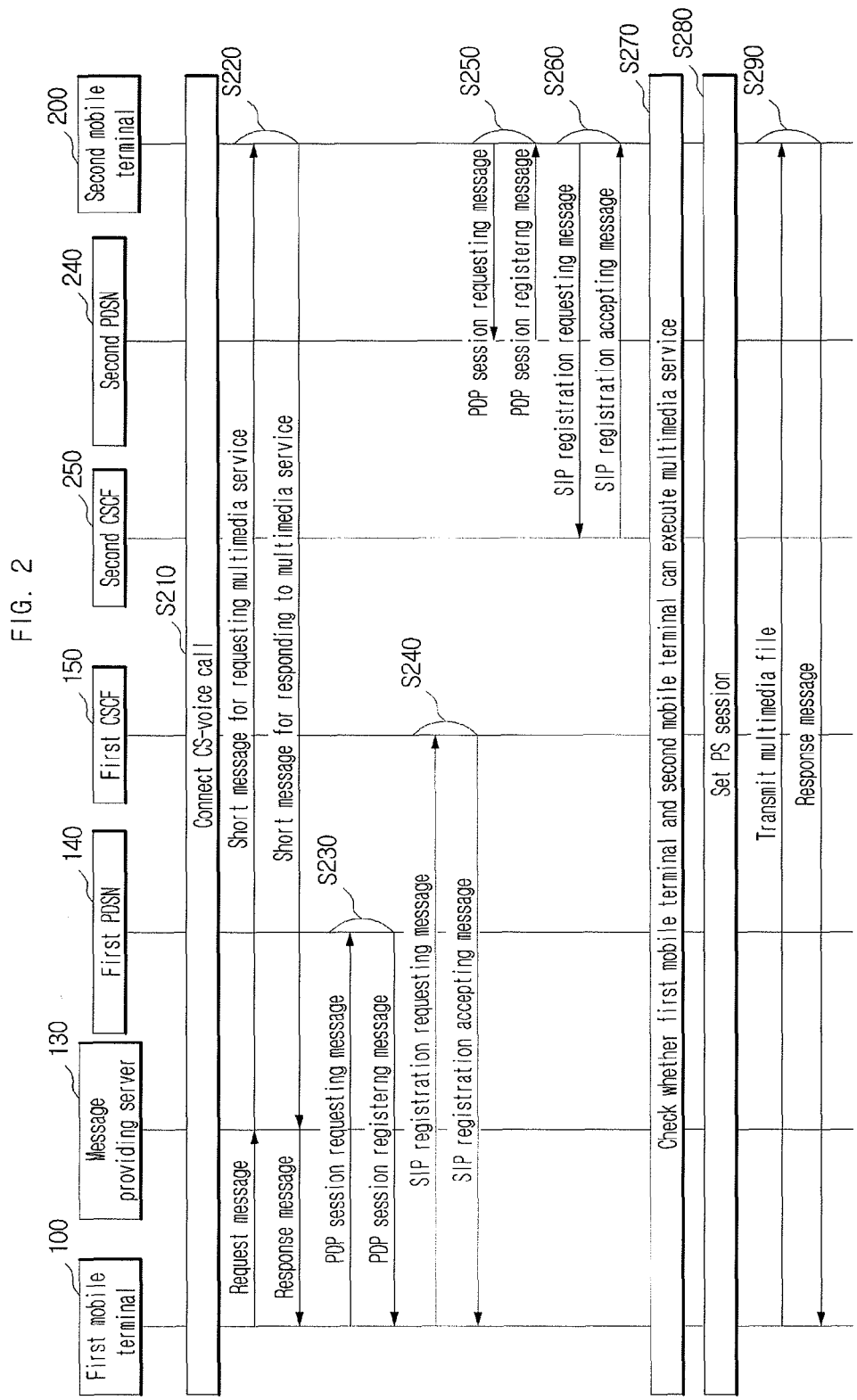
FIG. 2 shows a multimedia service method in accordance with an embodiment of the present invention.

FIG. 2 shows a multimedia service method in accordance with an embodiment of the present invention;

As shown in FIG. 2, the first mobile terminal 100 connects a circuit call for a voice call with the second mobile terminal 200 in a step represented by S210.

The first mobile terminal 100 firstly transfers a circuit call connection requesting message (SETUP) to the second mobile terminal 200 through the relay station 120 or the MSC 170. The mobile terminal 200 performs circuit call connection by transmitting a call connection message (CONNECT) corresponding to the circuit call connection requesting message (SETUP) for the voice call received from the first mobile terminal 100. By allotting a barrier for the circuit call connection through the network, the first mobile terminal 100 and the second mobile terminal 200 can connect the circuit call for the voice call.

The first mobile terminal 100 can transmit multimedia data such as video data for a video sharing service to the second mobile terminal 200 while being connected to the second mobile terminal 200 for voice call. However, the PDP session setting (or activation) and the SIP registration of the pertinent terminal is required to be performed before a multimedia service is provided in order to perform the multimedia service between each terminal in the IP based mobile communication network.

The first mobile terminal 100 can generate a short message for requesting a multimedia service and transmit the generated message to the second mobile terminal 200, and the second mobile terminal 200 can transmit a corresponding response message to the first mobile terminal 100, in a step represented by S220. This is because since it is impossible that it is recognized when the first mobile terminal 100 or the second mobile terminal 200 requests the multimedia service and the requested multimedia service is performed, the PDP session activation and the SIP registration of the first mobile terminal 100 or the second mobile terminal 200 are performed by using the short message for requesting the multimedia service at the point of time when the multimedia service is performed. Here, the short message for requesting multimedia service can be used in order to report that the request of performing the PDP session setting and the SIP registration of the opposite mobile terminal by using a PID or TID field included in a header field. The second mobile terminal 200 can receive the short message for requesting the multimedia service from the message providing server 130 and transmit a corresponding response message to the first mobile terminal 100.

If the response message received from the second mobile terminal 200 is related to accepting the request of the multimedia service, the first mobile terminal 100 sets the PDP session with a pertinent first PDSN 140, in a step represented by S230.

In order to execute the multimedia service, the first mobile terminal 100 generates information necessary to set the GPRS PDP session and store related information in a PDP session information (context) table. Then, the first mobile terminal 100 transmits a session setting requesting message (PDP context activation) to the PDSN 140 by using a signal control message provided by an UMTS. The PDSN 140, which has received the session setting requesting message, generates the PDP session and store the information received from the first mobile terminal 100. Then, the PDSN 140 sends the response message (PDP accept) corresponding to the session setting requesting message. Through the forgoing operations, the PDP session information (e.g. routing information) for sending the packet data among the first mobile terminal 100, the relay station 120 and the PDSN 140 is stored in each of the PDP session information tables of the first mobile terminal 100, the relay station 120 and the PDSN 140.

The first mobile terminal 100 can perform the SIP registration of the first mobile terminal 100 through the CSCF 150 by using the routing information generated through the PDP session setting in a step represented by S240. Here, the CSCF 150 can transmit a SIP registration accepting message to the first mobile terminal 100 and send a control message for registering the determined SIP in the HSS 160. The HSS 160 stores the routing information of the mobile terminal 100 and allows packet data transmitted from the network to be transferred to the first mobile terminal 100.

The second mobile terminal 200 can receive the short message for requesting the multimedia service, and if the second mobile terminal 200 transmits a corresponding response related to accepting the request of the multimedia service, the second mobile terminal 200 can perform the PDP activation and the SID registration by the identical method to that performed by the first mobile terminal 100, in steps represented by S250 and S260. Accordingly, the pertinent detailed description will be omitted.

While being connected to the second mobile terminal 200 for voice call, the first mobile terminal 100 checks whether the second mobile terminal 200 can provide the multimedia service before executing the multimedia service in a step represented by S270. This is because each terminal is required to have service ability capable of receiving the pertinent multimedia service in order to provide the multimedia service to the first mobile terminal 100 and the second mobile terminal 200.

The first mobile terminal 100 and the second mobile terminal 200 can check whether the opposite terminal can execute the multimedia service by exchanging a service ability requesting message (OPTIONS). For example, while being connected to the second mobile terminal 200 for voice call, the first mobile terminal 100 transmits the service ability requesting message checking whether the second mobile terminal can share video data to the second mobile terminal 200 in order to share the video data.

The second mobile terminal 200 transmits a response message (OK) corresponding to the service ability requesting message of the first mobile terminal 100 to the first mobile terminal 100. If the second mobile terminal 200 can execute the multimedia service, the first mobile terminal 100 can receive the response message and report to a user that the second mobile terminal 200 can execute the multimedia service through a user interface. Like the first mobile terminal 100, the second mobile terminal 200 can also transmit the service ability requesting message (OPTIONS) to the first mobile terminal 100 and receive the corresponding response message (OK) and report the result to a user through the user interface.

The user using the first mobile terminal 100 recognizes that the second mobile terminal 200 can execute the multimedia service and transmits multimedia data to the second mobile terminal 200 in a step represented by S290. Similarly, user using the second mobile terminal 200 recognizes that the first mobile terminal 100 can execute the multimedia service and transmits multimedia data to the first mobile terminal 100.

While being connected to the second mobile terminal 200 for voice call, the first mobile terminal 100 transmits a packet call setting requesting message (INVITE) for providing the second mobile terminal 200 with the multimedia data to the second mobile terminal 200. The second mobile terminal 200 transmits a packet call connecting message (OK) corresponding to the packet call setting requesting message received from the first mobile terminal 100. Then, the first mobile terminal 100 transmits a confirming message corresponding to the packet call connecting message to the second mobile terminal 200, and it is possible to transmit the multimedia data by connecting the packet call between the first mobile terminal 100 and the second mobile terminal 200.

While being connected to the second mobile terminal 200 for voice call through the connection of the circuit call with the second mobile terminal 200, the first mobile terminal 100 transmits multimedia data to the second mobile terminal 200 in order to be provided with the multimedia service. The multimedia data can be transmitted by a real time transport protocol (RTP) or other various protocols. Here, the RTP refers to the protocol providing end to end transport functions which is suitable for the application transmitting real-time data such as voice, video and simulation data on a multicast or unicast. Also, the RTP packet can be transferred by using the UDP. The second mobile terminal 200 receives the multimedia data from the first mobile terminal 100 by the RTP and transmits a corresponding response message. Here, the response message can be a receiver report (RR) by a RTP control protocol (RTCP).

The first mobile terminal 100 can disconnect the connected session by providing the second mobile terminal 200 with a message reporting that transmitting the multimedia data is completed, and then the second mobile terminal 200 can also disconnect the connected session.

Figure 3:
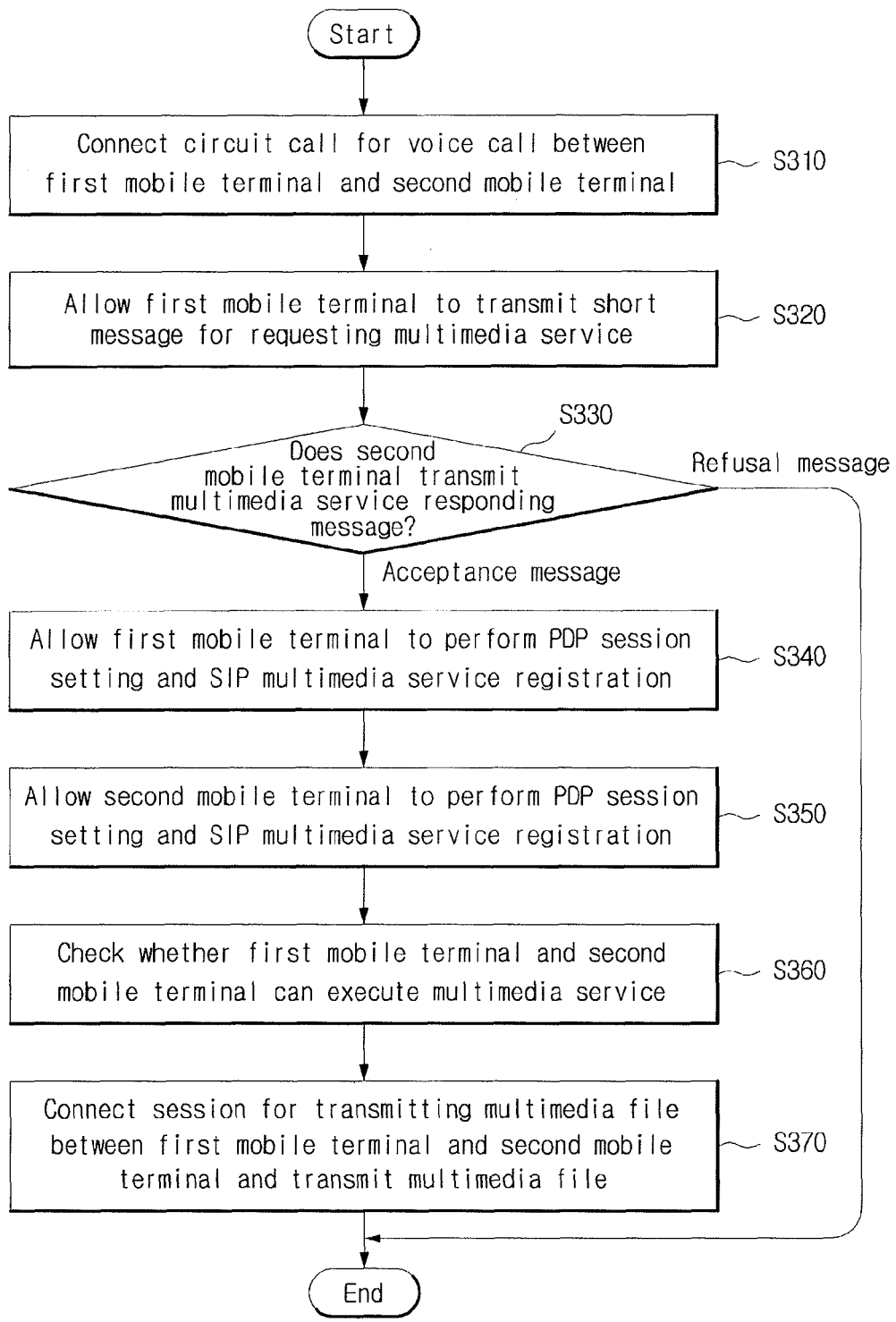
FIG. 3 is a flow chart showing a multimedia service method in accordance with an embodiment of the present invention.

FIG. 3 is a flow chart showing a multimedia service method in accordance with an embodiment of the present invention; and In a step represented by S310, a circuit call for voice call is connected between the first mobile terminal 100 and the second mobile terminal 200. The first mobile terminal 100 transfers a circuit call connection requesting message (SETUP) to the second mobile terminal 200 through a mobile communication network. The second mobile terminal 200 performs the circuit call connection by transmitting a call connection message (CONNECT) corresponding to the circuit call connection requesting message (SETUP) for voice call received from the first mobile terminal 100. The first mobile terminal 100 and the second mobile terminal 200 can be connected for voice call with each other through a bearer assigned by the circuit call connection.

In a step represented by S320, the first mobile terminal 100 generates a short message for requesting a multimedia service and transmits the generated message to the second mobile terminal 200. Here, the short message for requesting multimedia service can be used in order to report that the request of performing the PDP session setting and the SIP registration of the opposite mobile terminal by using a PID or TID field included in a header field.

In a step represented by S330, the second mobile terminal 200 can receive the short message for requesting multimedia service from the message providing server 130 and determine whether to execute the multimedia service with the first mobile terminal 100 to transmit a corresponding response message to the first mobile terminal 100.

In a step represented by S340, if the response message received from the second mobile terminal 200 is related to accepting the request of the multimedia service, the first mobile terminal 100 can set the PDP session with a pertinent first PDSN 140. The first mobile terminal 100 can also perform the SIP registration of the first mobile terminal 100 through the CSCF 150 by using the routing information generated through the PDP session setting. The first mobile terminal 100 can receive the response message from the PDSN 140 and register the SIP in the HSS 160 through CSCF 150.

In a step represented by S350, the second mobile terminal 200 receives the short message for requesting the multimedia service and transmits a message related to accepting the request of the multimedia service. Then, the second mobile terminal 200 performs the PDP session setting and the SIP registration for executing multimedia service.

In a step represented by S360, the first mobile terminal 100 and the second mobile terminal 200 check whether the opposite terminals can execute the multimedia service. As described above, it can be performed to check whether the opposite terminals can execute the multimedia service by exchanging a service ability requesting message.

In a step represented by S330, if it is determined that the first mobile terminal 100 and the second mobile terminal 200 can execute the multimedia service as the result of checking it, the first mobile terminal 100 or the second mobile terminal 200 can connect the session for exchanging packet data in order to be provided with the multimedia service in the state where the circuit call is connected to allow one of two terminals 100 and 200 is connected to the opposite mobile terminal for voice call before transmitting the multimedia data.

FIG. 4 shows a short message for requesting a multimedia service in accordance with an embodiment of the present invention.

As shown in FIG. 4, a short message for requesting a multimedia service is formed to include a header field according to a short message transport protocol data unit (TPDU). A TP-protocol identifier (TP-TIP) 410 included in a header field of the short message for requesting the multimedia service refers to the identifier having the size of 1 byte identifying each service designating how user data is analyzed and used in a short message service of WCDMA. A tele-service identifier in included in a header field of the short message for requesting the multimedia service refers to the identifier having the size of 2 bytes identifying each service designating how user data is analyzed and used in a short message service of CDMA. The type of the short message for requesting the multimedia service can depend on how the TP-TIP or the TID is designated. For example, if the TP-PID of the header field of the short message for requesting the multimedia service is determined as '0x00,' 0x48 and 0x4e can be determined as a call message and an URL call back message in a typical short message.

As described above, the first mobile terminal 100 can set a field of TP-PID 410 or TID of the short message for requesting the multimedia service and report a multimedia service request to the second mobile terminal 200 in order to execute the multimedia service with the second mobile terminal 200.

If the short message for requesting the multimedia service in which the TP-PID 410 is predetermined, for example as illustrated in FIG. 4, is received, the second mobile terminal 200 can transmit a message related to accepting the request as the result of determining it and perform the PDP session setting and the SIP registration in order to execute the multimedia service.

The above described method can be stored in a recorded medium (e.g. CDRom, RAM, ROM, floppy disk, hard disk, magneto-optical disk) having shapes capable of being realized as a program and readable by a computer.

At least one embodiment of the present invention can efficiently use IP resources which may be lost unnecessarily.

Further, at least one embodiment of the present invention can cut down installation expense by removing unnecessary wire or wireless resources to reduce the amount of communication equipment.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A multimedia service providing method in a telecommunication network, the method comprising:
communicating, at a message providing server, data with first and second mobile terminals in an Internet protocol (IP) based mobile communication network, wherein a circuit call for voice call between the first mobile terminal and the second mobile terminal is connected;
receiving, at the message providing server, a short message from the first mobile terminal, wherein the short message indicates that the first mobile terminal requests a multimedia service from the second mobile terminal, wherein the short message comprises a transport protocol data unit (TPDU) comprising a header field including a predetermined header value in at least one of a protocol identifier (PID) field and a tele-service identifier (TID), wherein the predetermined header value indicates that the message requests the multimedia service;

transmitting, by the message providing server, the short message to the second mobile terminal;

analyzing, by the second mobile terminal, the header field to determine whether the message requests the multimedia service;

if the message requests the multimedia service, transmitting, by the second mobile terminal, a response short message to the first mobile terminal through the message providing server, wherein the response short message indicates whether the multimedia service is accepted or declined;

if the response short message indicates accepting the multimedia service, checking, by the first mobile terminal and the second mobile terminal, whether to set a packet data protocol (PDP) session for performing the multimedia service;

if the PDP session should be set, initiating, by the first mobile terminal and the second mobile terminal, a setting of the PDP session for performing the multimedia service by transmitting a PDP session requesting message to a packet data serving node (PDSN) of the telecommunication network, wherein the PDP session requesting message is transmitted by using a signal control message provided by a universal mobile telephony service (UMTS); and initiating, by the first mobile terminal and the second mobile terminal, a session initiation protocol (SIP) registration by transmitting an SIP registration requesting message to a call session control function (CSCF) of the telecommunication network.

2. The method of claim 1, wherein the message providing server is a short message service center.

3. A multimedia service providing method in a telecommunication network, the method comprising:

communicating data with a first mobile terminal and a message providing server in an Internet protocol (IP) based mobile communication network, wherein a circuit call for voice call between the first mobile terminal and the second mobile terminal is connected;

receiving, at a second mobile terminal, a short message from the first mobile terminal, wherein the short message indicates that the first mobile terminal requests a multimedia service from the second mobile terminal, wherein the short message comprises a transport protocol data unit (TPDU) comprising a header field including a predetermined header value in at least one of a protocol identifier (PID) field and a tele-service identifier (TID), wherein the predetermined header value indicates that the message requests the multimedia service;

analyzing, by the second mobile terminal, the header field to determine whether the message requests the multimedia service;

if the message requests the multimedia service, transmitting, by the second mobile terminal, a response short message to the first mobile terminal through the message providing server, wherein the response short message indicates whether the multimedia service is accepted or declined;

if the response short message indicates accepting the multimedia service, checking, by the first mobile terminal and the second mobile terminal, whether to set a packet data protocol (PDP) session for performing the multimedia service;

if the PDP session should be set, initiating, by the first mobile terminal and the second mobile terminal, a setting of the PDP session for performing the multimedia service by transmitting a PDP session requesting message to a packet data serving node (PDSN) of the telecommunication network, wherein the PDP session requesting message is transmitted by using a signal control message provided by a universal mobile telephony service (UMTS); and initiating, by the first mobile terminal and the second mobile terminal, a session initiation protocol (SIP) registration by transmitting an SIP registration requesting message to a call session control function (CSCF) of the telecommunication network.

4. The method of claim 3, further comprising allowing the first mobile terminal to set a packet data protocol session with a packet data serving node corresponding to the first mobile terminal, prior to the step of receiving, at the second mobile terminal, the short message from the first mobile terminal.

5. The method of claim 3, further comprising:

checking whether the first mobile terminal and the second mobile terminal are available to execute the multimedia service; and if the first mobile terminal and the second mobile terminal are available to execute the multimedia service, transmitting multimedia data between the first mobile terminal and the second mobile terminal.

6. One or more non-transitory processor-readable storage devices having processor-readable code, the processor-readable code for programming one or more processors to perform a multimedia service providing method in a telecommunication network, the method comprising:

communicating, at a message providing server, data with first and second mobile terminals in an Internet protocol (IP) based mobile communication network, wherein a circuit call for voice call between the first mobile terminal and the second mobile terminal is connected;

receiving, at a the message providing server, a short message from the first mobile terminal, wherein the short message indicates that the first mobile terminal requests a multimedia service from the second mobile terminal, wherein the short message comprises a transport protocol data unit (TPDU) comprising a header field including a predetermined header value in at least one of a protocol identifier(PID) field and a tele-service identifier (TID), wherein the predetermined header value indicates that the message requests the multimedia service;

transmitting, by the message providing server, the short message to the second mobile terminal;

analyzing, by the second mobile terminal, the header field to determine whether the message requests the multimedia service;

if the message requests the multimedia service, transmitting, by the second mobile terminal, a response short message to the first mobile terminal through the message providing server, wherein the response short message indicates whether the multimedia service is accepted or declined;

if the response short message indicates accepting the multimedia service, checking, by the first mobile terminal and the second mobile terminal, whether to set a packet data protocol (PDP) session for performing the multimedia service;

if the PDP session should be set, initiating, by the first mobile terminal and the second mobile terminal, a setting of the PDP session for performing the multimedia service by transmitting a PDP session requesting message to a packet data serving node (PDSN) of the telecommunication network, wherein the PDP session requesting message is transmitted by using a signal control message provided by a universal mobile telephony service (UMTS); and initiating, by the first mobile terminal and the second mobile terminal, a session initiation protocol (SIP) registration by transmitting an SIP registration requesting message to a call session control function (CSCF) of the telecommunication network.

7. One or more non-transitory processor-readable storage devices having processor-readable code, the processor-readable code for programming one or more processors to perform a multimedia service providing method in a telecommunication network, the method comprising:

communicating data with a first mobile terminal and a message providing server in an Internet protocol (IP) based mobile communication network, wherein a circuit call for voice call between the first mobile terminal and the second mobile terminal is connected;

receiving, at a second mobile terminal, a short message from the first mobile terminal, wherein the short message indicates that the first mobile terminal requests a multimedia service from the second mobile terminal, wherein the short message comprises a transport protocol data unit (TPDU) comprising a header field including a predetermined header value in at least one of a protocol identifier (PID) field and a tele-service identifier (TID), wherein the predetermined header value indicates that the message requests the multimedia service;

analyzing, by the second mobile terminal, the header field to determine whether the message requests the multimedia service;

if the message requests the multimedia service, transmitting, by the second mobile terminal, a response short message to the first mobile terminal through the message providing server, wherein the response short message indicates whether the multimedia service is accepted or declined;

if the response short message indicates accepting the multimedia service, checking, by the first mobile terminal and the second mobile terminal, whether to set a packet data protocol (PDP) session for performing the multimedia service;

if the PDP session should be set, initiating, by the first mobile terminal and the second mobile terminal, a setting of the PDP session for performing the multimedia service by transmitting a PDP session requesting message to a packet data serving node (PDSN) of the telecommunication network, wherein the PDP session requesting message is transmitted by using a signal control message provided by a universal mobile telephony service (UMTS); and initiating, by the first mobile terminal and the second mobile terminal, a session initiation protocol (SIP) registration by transmitting an SIP registration requesting message to a call session control function (CSCF) of the telecommunication network.

8. A system for providing a multimedia service in a telecommunication network, the system comprising:

a communicating unit configured to communicate data with first and second mobile terminals in an Internet protocol (IP) based mobile communication network, wherein a circuit call for voice call between the first mobile terminal and the second mobile terminal is connected;

a receiving unit configured to receive a short message from the first mobile terminal, wherein the short message indicates that the first mobile terminal requests a multimedia service from the second mobile terminal, wherein the short message comprises a transport protocol data unit (TPDU) comprising a header field including a predetermined header value in at least one of a protocol identifier (PID) field and a tele-service identifier (TID), wherein the predetermined header value indicates that the message requests the multimedia service;

a transmitting unit configured to transmit the short message to the second mobile terminal;

the second mobile terminal configured to (i) analyze the header field to determine whether the message requests the multimedia service, and if the message requests the multimedia service, (ii) transmit a response short message to the first mobile terminal through the message providing server, wherein the response short message indicates whether the multimedia service is accepted or declined;

if the response short message indicates accepting the multimedia service, the first and second mobile terminals are configured to (i) check whether to set a packet data protocol (PDP) session for performing the multimedia service, and if the PDP session should be set, (ii) initiate a setting of the PDP session for performing the multimedia service by transmitting a PDP session requesting message to a packet data serving node (PDSN) of the telecommunication network, and (iii) initiate a session initiation protocol (SIP) registration by transmitting an SIP registration requesting message to a call session control function (CSCF) of the telecommunication network, wherein the PDP session requesting message is transmitted by using a signal control message provided by a universal mobile telephony service (UMTS).

* * * * *